United States Patent Office 3,539,940
Patented Nov. 10, 1970

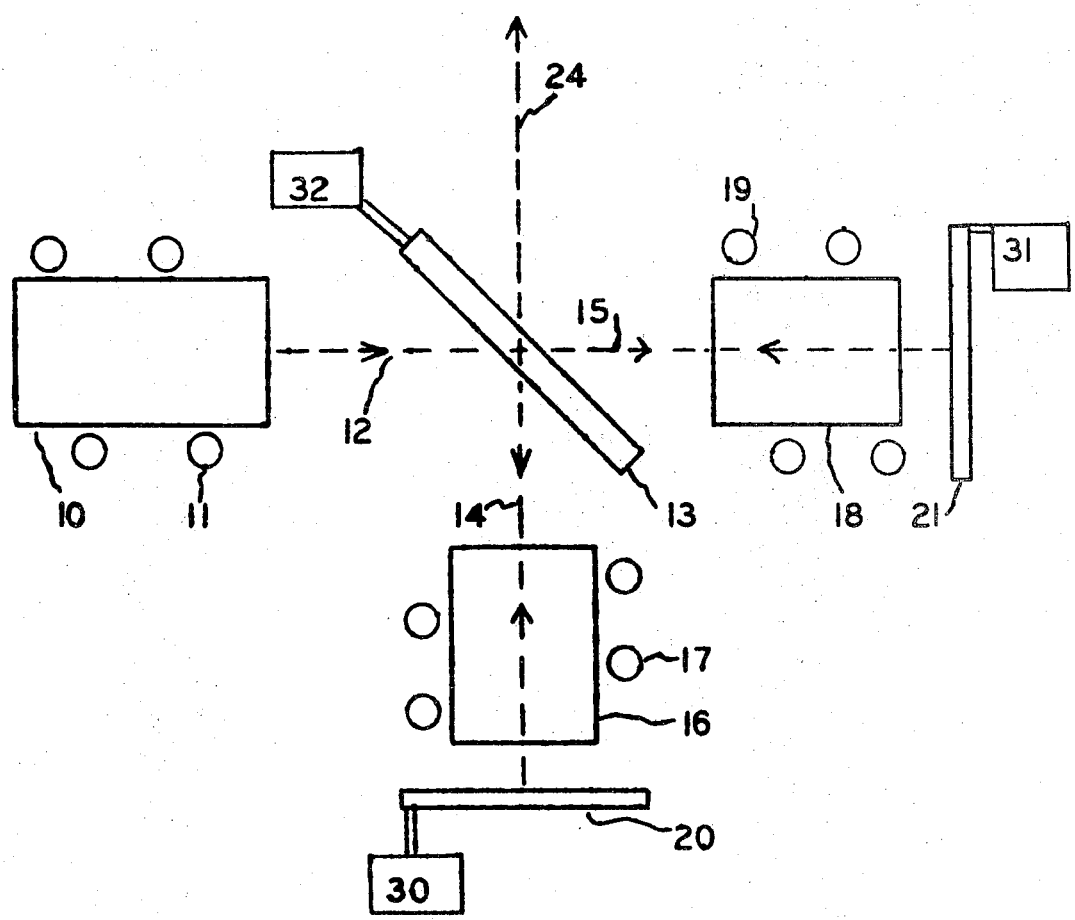

3,539,940
LIGHT AMPLIFIER WITH UNIDIRECTIONAL CHARACTERISTICS
Coleman J. Miller, Severna Park, Md., assignor, by mesne assignments, to the United States of America as represented by the Secretary of the Navy
Filed Nov. 8, 1966, Ser. No. 593,241
Int. Cl. H01s 3/05
U.S. Cl. 331—94.5      3 Claims

ABSTRACT OF THE DISCLOSURE

The invention disclosed herein relates to an optical isolator-amplifier that receives optical radiation, divides it into two parts, amplifies each part and recombines the two paths, such as there is destructive interference back along the input path and constructive interference along the output path.

---

This invention relates to an optical-amplifier and more specifically to a hybrid optical-amplifier having improved unit directional characteristics.

One of the problems encountered in the construction of multiple unit laser amplifiers is that the gain of the rods are not unidirectional, that is, they may propagate a wave in any of several modes. Such propagation may be extremely undesirable when several lasers elements are connected in a series arrangement because of the possibility of generating a wave in either direction. An additional problem is encountered when the wave reaches a certain magnitude of power in multiple unit systems. The possibility of glass and surface damage become real and there is a need to develop an amplifier to overcome these problems.

Therefore, it is an object of this invention to provide an improved optical laser amplifier with improved directional characteristics.

It is yet a further object of this invention to provide an hybrid isolator-amplifier for a laser system.

Another object of this invention is to provide an improved light isolator-amplifier comprising; a first input path for monochromatic light beams; a beam splitting mirror in the first path dividing received beams into second and third paths; first and second reflecting mirrors in the second and third paths; first and second light amplifiers positioned between the beam splitting mirror and the reflecting mirrors respectively; and an output path, the amplifiers and reflecting mirrors so positioned and spaced that a light beam projected along the input path is divided by the beam splitting mirror along the second and third paths, amplified through the amplifiers, reflected back through the amplifiers to the beam splitting mirror and recombined so that all the output is along the output path and substantially none is returned along the input path.

A further object of this invention is to provide an optical isolator capable of amplifying received signals and propagating them in one direction only.

Yet another object is to provide an improved isolator-amplifier, comprising: means for dividing a received electromagnetic wave into second and third waves, the waves being propagated along second and third paths; means for reflecting the second and third waves to the dividing means; means for amplifying the second and third waves in the second and third paths; and means for adjusting the length of the second and third paths to combine portions of the second and third waves along an output path.

Other objects, advantages and novel features of the invention will become apparent from the following detailed description of the invention when considered in conjunction with the accompanying drawings wherein; the figure shows one embodiment of the invention.

The embodiment of the invention shown in the figure includes a first source of electromagnetic wave radiation, including a material that will lase 10 with helical flash lamps 11 used as a pump. Laser 10 generates a coherent light beam in the direction of the dashed line 12 which propagates along this line as an input path. A hybrid mirror 13 capable of reflecting 50 percent of the light beam along a second path 14 is provided. The balance of the light beam along path 12 passes through hybrid mirror 13 and along a third path 15. A second laser 16 helical flash lamps 17, as a pump light source is positioned along second path 14. In addition a third laser 18 is positioned in the third path 15 and it too has helical flash lamps 19. A first reflecting mirror 20 is placed to receive light which has propagated along the second path 14 through laser 16 and to reflect it back along path 14. A second reflecting mirror 21 is placed to receive light which has propagated along the third path 15 through laser 18 and to reflect it back along path 15.

It is to be noted that amplification of the beams along paths 14 and 15 is accomplished by the double pass of the light beams through laser 16 and 18. As the beam progresses in its reflected portion of path 14 it again encounters hybrid mirror 13. A portion of this beam will be reflected back along the input path 12 if it was not 180° out of phase with that portion of the reflected beam coming back along the path 15 which would pass through the hybrid mirror. Since these two beams that would pass back along the input path 12 are 180° out of phase they in effect cancel each other due to destructive interference while the beam along output path 24 is an in-phase beam resulting from constructive interference and will be usable in further stages of the device.

The hybrid mirror consists of a flat sheet of glass with a dielectric coating causing it to reflect 50 percent of the incident energy at the designed frequency and at the angle of polarization used. A beam along input path 12 is split by hybrid mirror 13 with half of the energy, or .707 of the electric field intensity, directed towards each amplifier. After passing through the amplifiers 16, 18 and being reflected back through it by mirrors 20, 21, each beam has a field intensity of .707G, where G is the total voltage gain of the amplifier. Each beam then strikes the hybrid again, and .707 of the field intensity of each goes in each direction, towards the input along 12 and the output along path 24. Thus, two beams having a field intensity of .5G co-exist in each direction, one beam from each amplifier. If the total path lengths are adjusted so that the two beams add up in phase along the output, then the total field intensity is G in the output beam. Since this represents all of the energy, the phase relation must be such that the two beams towards the input path, 12, are 180° out of phase at the same time, and they cancel. Thus no energy is directed back to the input.

Shown in block diagram form are three adjustment members 30, 31, 32 used to position and adjust mirrors 20, 21 and 13 to obtain the proper phase relationship at the hybrid mirror 13. Throughout the discussion of the embodiment of the invention shown in this application, the lasers 16, 18 are discussed as consisting of one laser rod each. It should be understood that each could be replaced by an array of parallel rods.

Obviously many modifications and variations of the present invention are possible in the light of the above teachings. It is therefore to be understood that within the scope of the appended claims the invention may be practiced otherwise than as specifically described.

I claim:
1. An improved light isolator-amplifier, comprising:

(a) a first laser for projecting a coherent beam along a first path;
(b) a beam splitting mirror in said first path dividing received beams into second and third paths;
(c) first and second reflecting mirrors in said second and third paths;
(d) second and third lasers positioned between said beam splitting mirror and said first and second reflecting mirrors respectively; and
(e) first and second adjusting devices coupled respectively to said first and second reflecting mirrors to adjust the length of said second and third paths so that the outputs of said second and third lasers along a fourth path are added constructively and to destructively add the outputs of said second and third lasers along said first path.

2. The isolator-amplifier of claim 1 wherein there is provided means for adjusting said beam splitting mirror to adjust the phase relationship at said beam splitting mirror between the outputs of second and third lasers.

3. The isolator-amplifier of claim 2 wherein said beam splitting mirror passes substantially 50% of the output of said first laser and reflects substantialy 50% of the output of said first laser.

References Cited

UNITED STATES PATENTS 3,414,840  12/1968  Di Domenico et al. __ 331—94.5

WILLIAM L. SIKES, Primary Examiner

U.S. Cl. X.R.

356—106